(12) United States Patent
Bokelman

(10) Patent No.: US 6,293,542 B1
(45) Date of Patent: Sep. 25, 2001

(54) AUTOMATED SHEET DELIVERY TO SELECTED PATHS USING ACTIVE GATE AND DRAG CLUTCH

(75) Inventor: Kevin Bokelman, La Jolla, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/518,460

(22) Filed: Mar. 3, 2000

(51) Int. Cl.$^7$ .................................................. B65H 29/58
(52) U.S. Cl. .......................... 271/186; 271/302; 271/303; 271/902; 399/374; 399/364
(58) Field of Search ..................... 271/291, 297, 271/302, 303, 184, 186, 902; 399/373, 374, 364

(56) References Cited

U.S. PATENT DOCUMENTS

| | | |
|---|---|---|
| 4,660,963 | 4/1987 | Stemmle . |
| 4,699,367 * | 10/1987 | Russel ................................... 271/186 |
| 4,883,266 | 11/1989 | Fujii . |
| 5,016,061 | 5/1991 | Tashiro et al. . |
| 5,093,690 * | 3/1992 | Ohno et al. ........................... 271/184 |
| 5,131,649 | 7/1992 | Martin et al. . |
| 5,181,714 * | 1/1993 | Yamagishi et al. ................... 271/186 |
| 5,201,517 | 4/1993 | Stemmle . |
| 5,430,536 | 7/1995 | Fullerton et al. . |
| 5,784,680 | 7/1998 | Taruki . |
| 5,887,868 * | 3/1999 | Lambert et al. ...................... 271/186 |

* cited by examiner

*Primary Examiner*—Christopher P. Ellis
*Assistant Examiner*—Mark A. Deuble

(57) ABSTRACT

A method and apparatus of processing sheet media such as document sheets to be duplex scanned or media sheets on which two sided printing is to take place includes automatic positioning of an active sheet guide gate and drag clutch by the rotation of a transport roller with which the active gate and drag clutch is frictionally engaged. The transport roller may comprise one or more coaxial rollers in an assembly positioned in the media path and is rotatable in different directions such that the leading edge of a moving media sheet is moved through one or the other of two nips defined between the transport roller assembly and associated upper and lower pinch rollers. The direction of rotation of the transport roller assembly can be reversed before the sheet leaves the nip to thus re-position the sheet guide gate and re-route the sheet back in a desired path to a scanner or printer for further sheet processing.

16 Claims, 4 Drawing Sheets

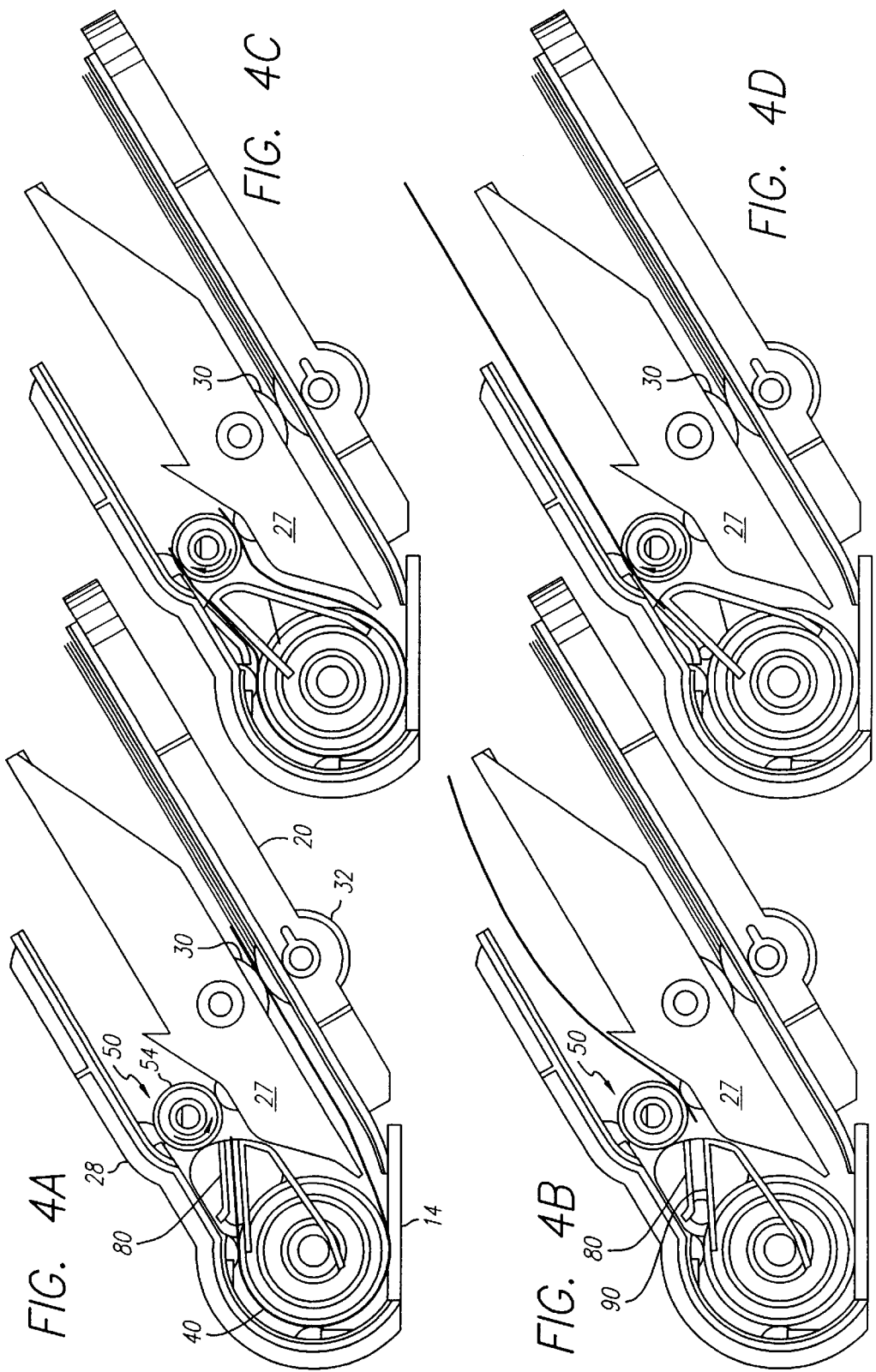

AUTOMATED SHEET DELIVERY TO SELECTED PATHS USING ACTIVE GATE AND DRAG CLUTCH

CROSS REFERENCE TO RELATED APPLICATIONS, IF ANY

None.

BACKGROUND OF THE INVENTION AND PRIOR ART

The present invention relates to the transport of individual cut sheets of flat flexible media such as paper, vellum, transparencies or the like through a transport path which may have various branches for the delivery of sheets such as printed sheets of media from an input location to a desired location. For the purposes of illustration but not limitation, the invention will be described in the context of a document scanning apparatus having a sheet transport path which extends from a stack of document sheets to be scanned to and through a scanning location to a scanned document location where the scanned sheets are stacked. More particularly, the invention is concerned with the guiding and movement of sheets in a scanning apparatus or printer capable of duplex scanning or printing wherein one side of a media sheet is first scanned or printed and then, if desired, the individual sheets may then be turned over and routed back to the scanning or printing region for scanning or printing the other side of the sheet. The teachings of the invention are applicable generally to any office or business machine in which flexible media sheets must be moved to selected paths.

As used herein, the term "sheet processing apparatus" is therefore intended to broadly include, but not necessarily be limited to, printers, stand alone document copiers, facsimile machines, document scanning machines and combinations of such units.

SUMMARY OF THE INVENTION

The present invention provides a method of processing sheet media in a sheet processing apparatus comprising the steps of:

a) moving individual media sheets from a first location to a processing location in said sheet processing apparatus;

b) processing a first face side of a media sheet at said processing location;

c) moving said sheet from said processing location into a sheet guide channel in a pivotally mounted active gate extending across a media path;

d) rotating a sheet transport roller in a selected direction to cause said roller to frictionally engage and pivotally move said gate to a first position in which said guide channel is aligned with one of two nips extending to spaced sheet delivery paths; and e) gripping said sheet in a selected one of said nips and rotating said transport roller in a direction to transport said sheet away from said processing location through said guide channel into one of said spaced sheet delivery paths.

In apparatus terms, the present invention comprises a sheet media processing apparatus which includes:

a) a sheet media input support;

b) a sheet media processor;

c) a processed sheet media support;

d) sheet guides defining a media transport path extending from said input support past said processor to said processed sheet media support;

e) sheet transport means for moving individual media sheets along said path; and f) an active sheet routing gate and drag clutch which includes a sheet routing channel which is moveable in said media transport path in a space between an input and first and second output branches; said sheet transport means including a driven sheet transport roller and a power drive for rotating said transport roller in opposite directions to move said leading edge of said sheet along a selected output branch, said gate and drag clutch being engaged with said transport roller to move said sheet routing channel to extend from said input toward a selected one of said first and second output branches.

BRIEF DESCRIPTION OF THE DRAWINGS

FIGS. 4a–4d are side elevation views sequentially showing the progress of a media sheet through the document scanning apparatus.

DESCRIPTION OF THE PREFERRED EMBODIMENT

Figure 1A:
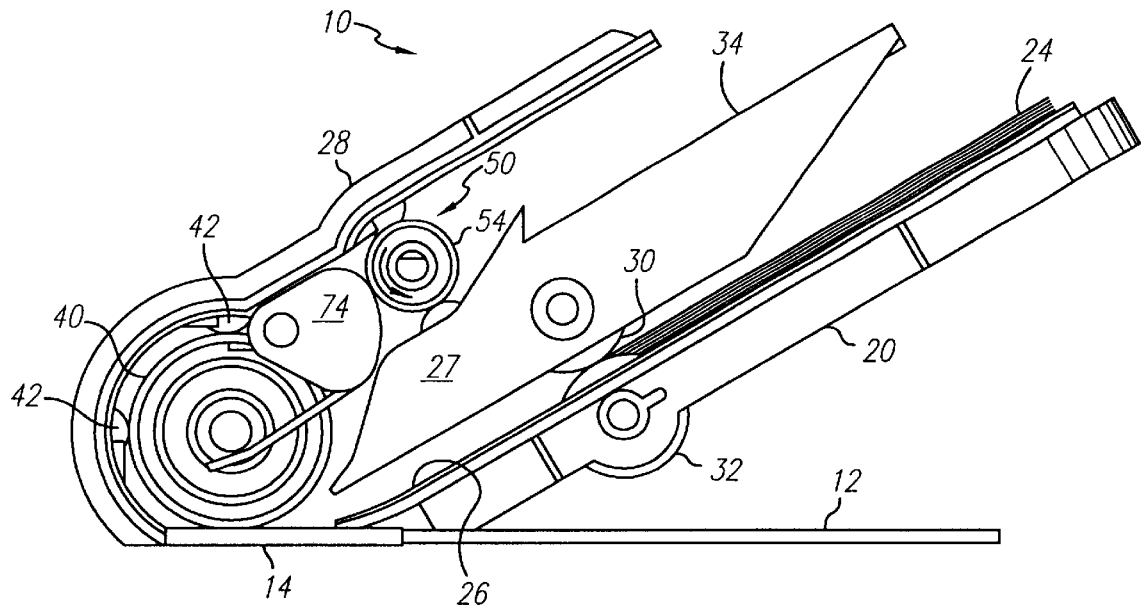
FIG. 1a and 1b are side elevation views of a document scanning apparatus which incorporates the teachings of the present invention including an active sheet routing gate and drag clutch, the gate being in a lower position if FIG. 1a and in an upper position in FIG. 1b.

As shown in the drawings, a document scanning apparatus 10 includes a generally flat horizontally extending glass table or platen surface 12 for single sheet scanned having a region 14 at one end thereof through which a moving document to be scanned can be viewed by conventional document scanning components of the device. An inclined frame 20 is provided for supporting a stack 24 of documents to be fed to the scanning components. An inclined surface or guide 26 on the frame 20 and stationary media sheet guides 27, 28 on the frame together define a sheet media path extending from the media stack 24 to the scan region 14 and thence around a scanning roller 40 and document output sheet transport roller assembly 50 to a scanned document output location at which a tray 34 is provided for receiving a stack of scanned documents. Circumferentially spaced pinch rollers 42 hold the document sheet against the scanning roller. The apparatus for feeding individual sheets from the stack 24 to the scan region 14 includes the inclined media support or feed tray 22, upper and lower opposed media pick rollers 30, 32 and a suitable drive mechanism for moving the rollers 30, 32. The drive mechanism may be arranged to drive the rollers 30, 32 in the same forward direction of rotation (e.g., clockwise) for uppermost sheet picking and in the same reverse direction (e.g., counterclockwise) for lowermost sheet picking as described in commonly owned co-pending application Ser. No. 09/405,991 (HP Docket 10991829-1) filed Sep. 27, 1999.

Figure 2A:
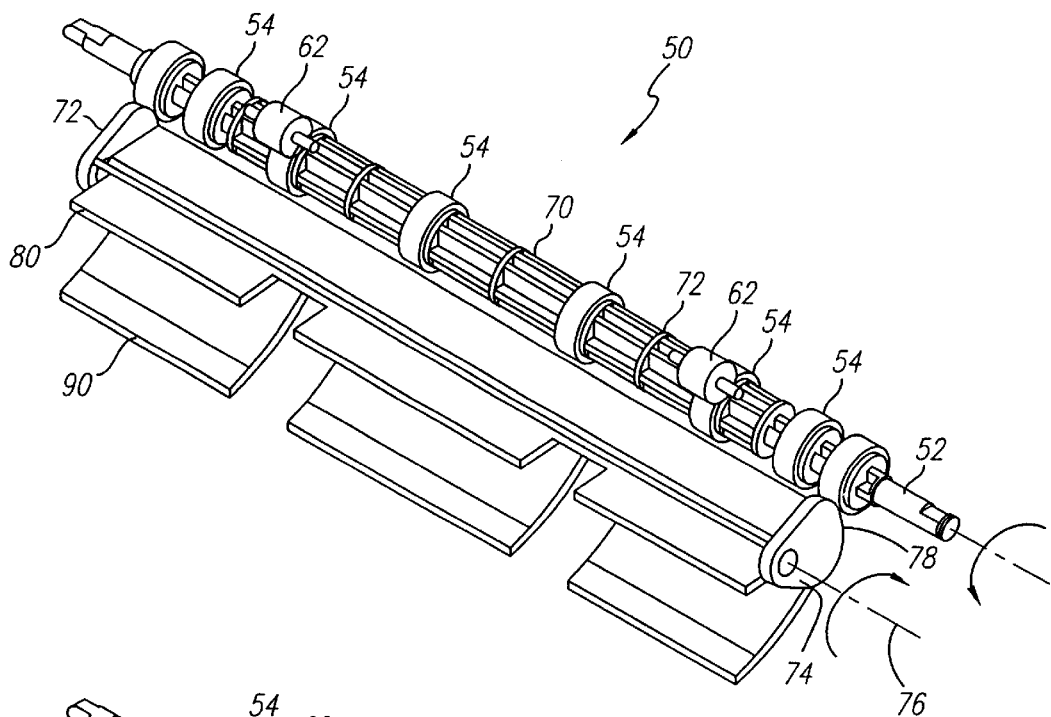
FIGS. 2a and 2b are perspective views of a transport roller assembly comprised of a series of spaced coaxially arranged sheet drive rollers and pinch rollers with the active gate and drag clutch engaged with the transport rollers at each end of the assembly at the sides of a sheet media path, the gate being in a lower position in FIG. 2a and in an upper position in FIG. 2b.
Figure 2B:
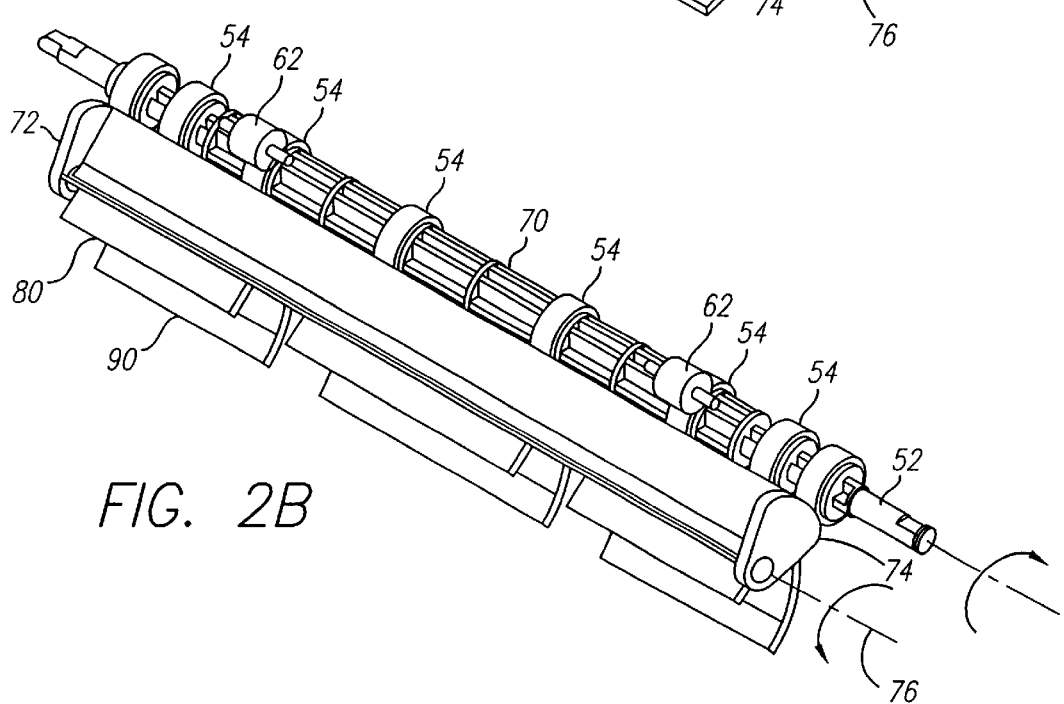

FIGS. 2a and 2b respectively show perspective views of a transport roller assembly 50 comprised of a rotatable shaft 52 having a plurality of sheet transport rollers 54 affixed thereto at axially spaced locations along the shaft 52. Each of the rollers 54 is preferably identical to the other rollers 54 and has a rubberized or other frictional surface. As used herein, the term "roller" is intended to include a single elongated roller and the mechanical equivalents of two or more axially spaced rollers on a common shaft or axis as shown. The transport roller assembly may be molded of plastic with a plurality of elongated ribs 70 and circumferential rings 72 to provide support as necessary to the media sheet.

Figure 1B:
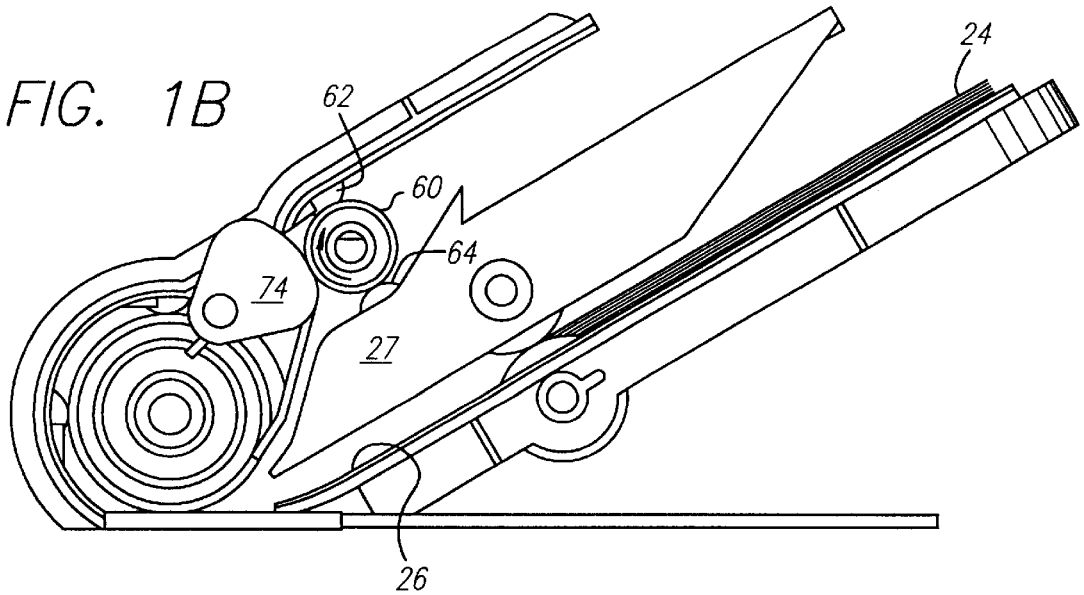
Figure 3A:
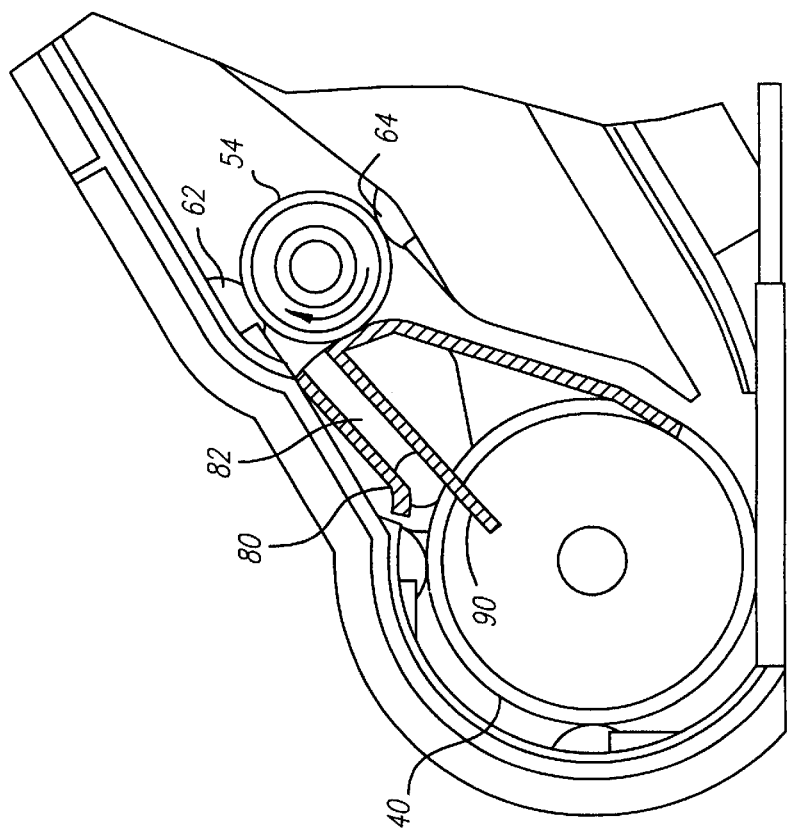
FIGS. 3a and 3b are enlarged schematic side elevation views, partly in cross section, of the active sheet routing gate and drag clutch operating in conjunction with the reversible sheet transport output roller assembly.
Figure 3B:
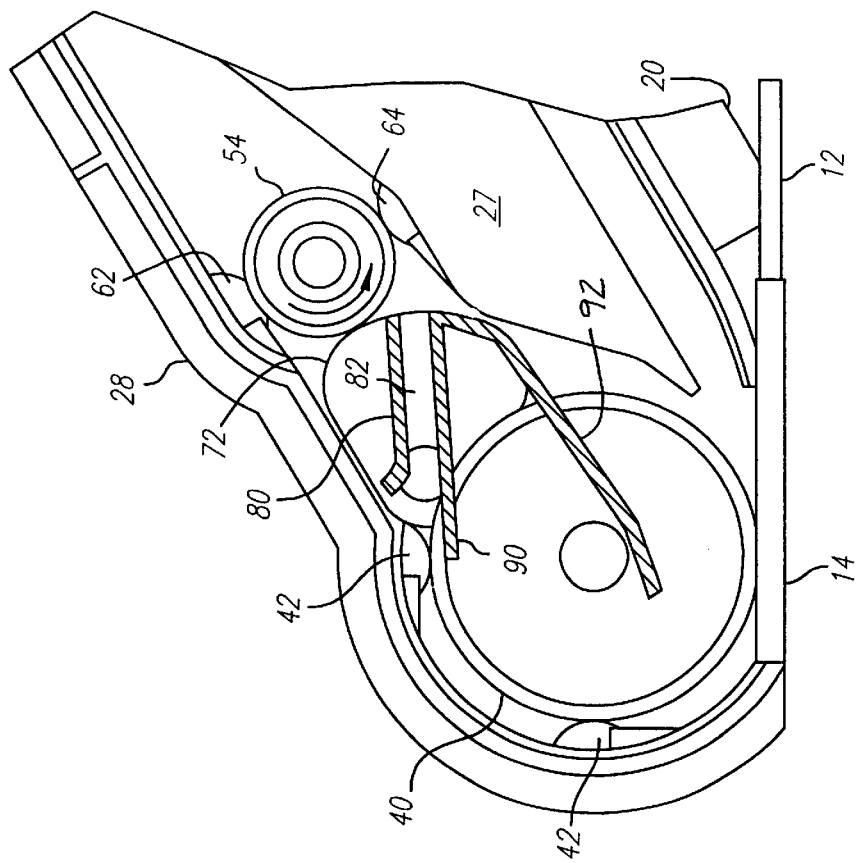

Pinch rollers 62 and 64 are respectively positioned above and below the transport roller assembly 50 and tangentially engage the rollers 54 to provide nips and media sheet delivery paths above and below the transport roller assembly 50. Only the upper pinch rollers 62 are shown in the perspective views of FIGS. 2a and 2b but the lower rollers 64 are also seen in FIGS. 1a and 1b as well as in FIGS. 3 and 4. The lower pinch rollers 64 are, like the upper pinch rollers 62, engaged tangentially with selected ones of the transport rollers 54. Preferably, the pinch rollers 62, 64 are c on diametrically opposite sides of the transport roller assembly 50 although it is not essential to do so. A suitable power drive, not shown, is provided for rotating the transport roller assembly 50 in either the clockwise or the counterclockwise direction as desired.

Since rollers 54 are primarily used for transporting the sheet of media through nips defined between the rollers 54 and the pinch rollers 62, 64, preferably all of the transport rollers 54 and pinch rollers 62, 64 are provided with traction surfaces suitable for gripping and transporting media sheets through the nips as is conventional. The pinch rollers 62, 64 may be spring biased into engagement with the transport rollers 54 and comprise idlers which are only rotatable when the power driven transport roller assembly 50 is rotated. The opposed drive and pinch rollers 54, 62, 64 in surface contact provide one way of defining sheet transport nips as is well known; however, in the context of referring top nips defined by rollers, the term "roller" is also intended and specifically defined to include mechanical substitutes having opposed surfaces which define nips such as opposed continuous belts trained around rollers or an opposed roller and belt which together define a nip.

An active gate and drag clutch 70 best seen in FIGS. 2a and 2b is located in a space in the media transport path between an input to the gate and clutch 70 from the document drive roller 40 and first and second media output branches above and below the transport roller assembly 50. The active gate and clutch 70 is comprised of a pair of end plates 72, 74 rotatable about a common axis 76 which extends parallel to shaft 52. The document path between the end plates 72, 74 of the active gate and drag clutch 70 is bridged by upper and lower sheet guides 80, 90 of plastic or light weight sheet metal affixed to the end plates whereby the guides 80, 90 define a sheet routing or guide channel 82 (FIG. 3) therebetween for guiding the leading edge of a sheet from the top surface of the document drive roller 40 to either one of a lower nip or nips between the document delivery roller or rollers 54 and the lower pinch rollers 64 or to an upper nip between the document delivery roller or rollers 54 and the upper pinch rollers 62 depending upon the position of the gate and drag clutch 70. An arcuate side edge 78 on each end plate 72, 74 frictionally engages the cylindrical surface of the axially outermost transport rollers 54 or other similarly moveable portions of the transport roller assembly 50 such that rotation of the transport roller assembly 50 including the rollers 54 determines the position of the active gate and drag clutch 70. Clockwise rotation of shaft 52 causes counterclockwise pivotal motion of gate 70 about its axis 76 until gate 70 reaches its uppermost limit position shown in FIGS. 1b, 2b and 3b following which slippage between the arcuate surfaces 78 of the gate end plates and the transport rollers 54 holds the active gate 70 in the selected position. Gate motion limit stops (not shown) are provided at the desired locations on the scanning apparatus to limit the motion of the gate and drag clutch 70 between the positions shown in FIGS. 1a and 1b. The lower sheet guide 90 includes a lower portion 92 as shown for a purpose which will be described with reference to FIG. 4.

FIG. 4a shows the initial movement of a sheet of paper or other media from the top or bottom of the stack 24 by the opposed pick rollers 30, 32. In the position shown in FIG. 4a, the leading edge of the sheet has been driven by the document drive roller 40 through the sheet processing location 14, the leading edge of the sheet having reached a location in the sheet guide channel 82 between the gate sheet guides 80, 90. As the leading edge of the sheet, moved by the document drive roller 40 approaches the active gate 70, but before it enters channel 82, a timing circuit actuates the power drive to cause rotation of the transport roller assembly 50 in the counterclockwise direction as seen in FIG. 4a to move the gate 70 to its downward position. Continued movement of the leading edge of the media sheet causes the leading edge to enter the lower nip or nips between the transport rollers 54 and the lower pinch rollers 62 to transport the leading edge of the sheet through the channel 82 into the lower output path between the stationary guide 27 and transport roller assembly 50. The rotation of the nip between the sheet transport roller or rollers 54 and the lower pinch rollers 64 continues to move the sheet to the right below the transport roller assembly 50 thus causing the trailing portion of the sheet to move entirely through and away from the processing location 14 and document drive roller 40 toward the processed sheet location or tray 34 as seen in FIG. 4b.

In FIG. 4c the direction of rotation of the transport roller assembly 50 is reversed such that the roller assembly 50 now begins to rotate in a clockwise direction before the trailing edge of the sheet has passed the nip between the transport rollers 54 and lower pinch rollers 64 from the sheet position seen in FIG. 4b. This causes the sheet to move back toward the processing location 14 in face inverted orientation so that the other face side of the document sheet can now be scanned or printed upon. Clockwise rotation of the transport roller assembly 50 causes movement of the active gate and drag clutch 70 to the upper position seen in FIG. 4c. this causes movement of the lower portion 92 of the lower gate guide 90 to a position spaced from and generally parallel to stationary guide 27 to guide the sheet back to the document drive roller 40. During scanning or printing of the second face side of the sheet, the document drive roller 40 continues to rotate in the clockwise direction moving the sheet through the sheet processing region 14 until the leading edge of the sheet (previously the trailing edge) enters the guide channel 82 between the gate guides 80, 90 and moves into the nip or nips between the transport roller or rollers 54 and upper pinch rollers 62 so that the document sheet, now having been duplex scanned or printed, may be passed over the transport roller assembly 50 to the tray 34.

In its broadest aspects, the invention involves the use of the active gate and drag clutch 70 to guide the leading edge of a moving media sheet to one of two output paths which, in the arrangement shown, are above and below the transport roller assembly 50. There is of course no reason that these teachings need be limited to a horizontally oriented transport roller assembly 50 since the principles of the invention will clearly be applicable to the handling of sheet media moving with its flat surfaces in a non-horizontal path provided that appropriate minor modifications are made. In the preferred embodiment shown, separate transport rollers 54 and associated pinch rollers 62, 64 transport the sheet past the transport roller assembly 50 on the selected upper or lower side depending upon the direction of rotation of the transport roller assembly 50.

The active sheet guide gate and drag clutch 70 can be molded or otherwise fabricated of plastics or other light weight materials. The details of a suitable drive arrangement for rotating the roller assembly 50 in the desired directions of rotation at the desired time are well within the skill of persons skilled in the art and is therefore not described herein. Persons skilled in the art will also appreciate that various additional modifications can be made in the preferred embodiment shown and described above and that the scope of protection is limited only by the wording of the claims which follow.

What is claimed is:

1. A method of processing sheet media in a sheet processing apparatus comprising the steps of:
   a) moving individual media sheets from a first location to a processing location in said sheet processing apparatus;
   b) processing a first face side of a media sheet at said processing location;
   c) moving said sheet from said processing location into a sheet guide channel in a pivotally mounted active gate extending across a media path;
   d) rotating a sheet transport roller in a selected direction to cause said roller to frictionally engage and pivotally move said gate to a first position in which said guide channel is aligned with one of two nips extending to spaced sheet delivery paths; and
   e) gripping said sheet in a selected one of said nips and rotating said transport roller in a direction to transport said sheet away from said processing location through said guide channel into one of said spaced sheet delivery paths.

2. The method of claim 1, further comprising:
   f) reversing the direction of rotation of said transport roller before a trailing edge of said sheet passes through said selected nip to rotate said gate to a second position in which a sheet guide on said gate assists in feeding said sheet back to said processing location in face inverted orientation for processing a second face side of said document sheet and to align said channel with the other one of said nips;
   g) processing said second face side of said sheet at said processing location and moving said sheet from said processing location into said sheet guide channel in said gate; and
   h) gripping opposite face sides of said moving sheet in said other one of said nips and rotating said transport roller to transport said sheet from said processing location through said guide channel into another one of said sheet delivery paths.

3. The method of claim 2, further comprising moving said sheet in engagement with said transport roller in vertically spaced output paths which extend over and under said transport roller to a processed sheet delivery location by using vertically spaced pinch rollers engaged with said transport roller to comprise said nips.

4. The method of claim 3, wherein said processing comprises scanning of sheet media.

5. The method of claim 3, wherein said processing comprises printing of sheet media.

6. A sheet media processing apparatus which includes:
   a) a sheet media input support;
   b) a sheet media processor;
   c) a processed sheet media support;
   d) sheet guides defining a media transport path extending from said input support past said processor to said processed sheet media support;
   e) sheet transport means for moving individual media sheets along said path; and
   f) an active sheet routing gate and drag clutch which includes a sheet routing channel which is moveable in said media transport path in a space between an input and first and second output branches;
   said sheet transport means including a driven sheet transport roller and a power drive for rotating said transport roller in opposite directions to move said leading edge of said sheet along a selected output branch, said gate and drag clutch being engaged with said transport roller to move said sheet routing channel to extend from said input toward a selected one of said first and second output branches.

7. The sheet processing apparatus of claim 6, wherein said gate and drag clutch comprises a pair of end plates and first and second sheet guides extending between said end plates defining said routing channel therebetween, said end plates being mounted for pivotal movement around a common axis parallel to the axis of said sheet transport roller, said input to said gate being proximate said axis.

8. The sheet processing apparatus of claim 7, wherein said sheet guides include substantially parallel portions defining said routing channel.

9. The sheet processing apparatus of claim 8, wherein one of said sheet guides further includes a portion for guiding sheet media toward said sheet media processor.

10. The sheet processing apparatus of claim 9, wherein said sheet transport roller comprises a plurality of axially aligned sheet transport rollers, and further comprising pinch rollers in surface engagement with at least some of said transport rollers to define a nip for receiving a leading edge of a media sheet and for moving said leading edge along a first one of said output branches.

11. The sheet processing apparatus of claim 10, further comprising second pinch rollers in surface engagement with at least some of said transport rollers to define a second nip for receiving a leading edge of a media sheet and for moving said leading edge along a second one of said output branches.

12. The sheet processing apparatus of claim 11, further comprising stationary guides proximate said pinch rollers for guiding a media sheet output branches.

13. The sheet processing apparatus of claim 12, wherein said pinch rollers are biased into engagement with said drive rollers.

14. The sheet processing apparatus of claim 12, wherein said processor comprises a scanner.

15. The sheet processing apparatus of claim 12, wherein said processor comprises a printer.

16. The sheet processing apparatus of claim 6, wherein said sheet transport means comprises a sheet media feeder for feeding individual media sheets from a stack on said input support into said media transport path.

* * * * *